United States Patent
Yagi

(10) Patent No.: US 11,093,281 B2
(45) Date of Patent: Aug. 17, 2021

(54) INFORMATION PROCESSING APPARATUS, CONTROL METHOD, AND PROGRAM TO CONTROL ALLOCATION OF COMPUTER RESOURCES FOR DIFFERENT TYPES OF TASKS

(71) Applicant: NEC CORPORATION, Tokyo (JP)

(72) Inventor: Takashi Yagi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 105 days.

(21) Appl. No.: 16/370,460

(22) Filed: Mar. 29, 2019

(65) Prior Publication Data

US 2019/0303199 A1    Oct. 3, 2019

(30) Foreign Application Priority Data

Mar. 30, 2018  (JP) .............................. JP2018-069581

(51) Int. Cl.
G06F 9/48    (2006.01)
G06F 9/50    (2006.01)

(52) U.S. Cl.
CPC .............. G06F 9/4881 (2013.01); G06F 9/50 (2013.01)

(58) Field of Classification Search
CPC ................................ G06F 9/4881; G06F 9/50
USPC ................................................... 718/1–108
See application file for complete search history.

(56) References Cited

U.S. PATENT DOCUMENTS

| 3,611,306 | A | * | 10/1971 | Reigel | G06F 15/8007 |
| | | | | | 717/149 |
| 9,703,285 | B2 | * | 7/2017 | Zhong | G06Q 50/188 |
| 2010/0318637 | A1 | * | 12/2010 | Ly | G06Q 10/06 |
| | | | | | 709/221 |
| 2012/0159322 | A1 | | 6/2012 | Ikegami | |
| 2016/0117180 | A1 | * | 4/2016 | Cardonha | G06F 11/3024 |
| | | | | | 713/100 |
| 2019/0095247 | A1 | * | 3/2019 | Shimamura | G06F 9/4881 |

FOREIGN PATENT DOCUMENTS

| CN | 105468452 A | 4/2016 |
| CN | 105843679 A | 8/2016 |
| JP | 2001-195268 A | 7/2001 |
| JP | 2016-91489 A | 5/2016 |

OTHER PUBLICATIONS

Li, Ji, et al. "Deep reinforcement learning based computation offloading and resource allocation for MEC." 2018 IEEE Wireless Communications and Networking Conference (WCNC). IEEE, 2018. pp. 1-6 (Year: 2018).*

(Continued)

*Primary Examiner* — Satish Rampuria
(74) *Attorney, Agent, or Firm* — Sughrue Mion, PLLC

(57) ABSTRACT

An information processing apparatus determines computer resources to be allocated to each task execution entity, based on upper limit value information and processing amount information. The upper limit value information indicates an upper limit value of the total amount of computer resources to be allocated to all task execution entities. The processing amount information indicates an amount of tasks to be processed by each task execution entity.

6 Claims, 7 Drawing Sheets

(56) References Cited

OTHER PUBLICATIONS

Pawar, Chandrashekhar S., and Rajnikant B. Wagh. "Priority based dynamic resource allocation in cloud computing." 2012 International Symposium on Cloud and Services Computing. IEEE, 2012. pp. 1-6 (Year: 2012).*

Li, Jiayin, et al. "Adaptive resource allocation for preemptable jobs in cloud systems." 2010 10th International Conference on Intelligent Systems Design and Applications. IEEE, 2010.pp. 31-36 (Year: 2010).*

Dai, Yuan-Shun, and Gregory Levitin. "Optimal resource allocation for maximizing performance and reliability in tree-structured grid services." IEEE Transactions on Reliability 56.3 (2007): p. 444-453. (Year: 2007).*

Dong, Hanfei, et al. "Formal discussion on relationship between virtualization and cloud computing." 2010 International Conference on Parallel and Distributed Computing, Applications and Technologies. IEEE, 2010.pp. 448-453 (Year: 2010).*

Kesidis, George, et al. "Scheduling distributed resources in heterogeneous private clouds." 2018 IEEE 26th International Symposium on Modeling, Analysis, and Simulation of Computer and Telecommunication Systems (MASCOTS). IEEE, 2018.pp. 102-108 (Year: 2018).*

Communication dated Mar. 16, 2020 by Intellectual Property Office of Singapore in application No. 10201902650V.

* cited by examiner

FIG. 7

| TASK | COMPUTER RESOURCE |
|---|---|
| task1 | CPU |
| task2 | BANDWIDTH OF NETWORK |
| task3 | BANDWIDTH OF STORAGE |
| ... | ... |

INFORMATION PROCESSING APPARATUS, CONTROL METHOD, AND PROGRAM TO CONTROL ALLOCATION OF COMPUTER RESOURCES FOR DIFFERENT TYPES OF TASKS

BACKGROUND

Technical Field

The invention relates to control of allocation of computer resources.

Related Art

A technology of controlling allocation of computer resources to an application has been developed. Japanese Patent Application Publication No. 2001-195268 discloses a technology that enables to perform settings of computer resources usable by an application in plural stages for each application. Specifically, the maximum amount of computer resources usable by an application has been preset for each application service level. An application starts after an application service level is specified. Thus, computer resources of an amount corresponding to the specified application service level are allocated to the application. Note that, in a case where the amount of the computer resources is insufficient, the computer resources are secured by suspending execution of an application which is running at a lower application service level.

SUMMARY

It is possible that an application is constituted by plural types of tasks, and each task execution entity (for example, process) executes one of different types of tasks. For example, there is a case where three tasks of reading, processing, and writing data are executed in different processes, respectively. As described above, in a case where a plurality of task execution entities operates, computer resources are allocated to each of the task execution entities. Therefore, it may not be possible to appropriately control an operation of an application only by controlling the maximum amount of computer resources to be allocated to the application.

Considering the above problems, the invention has been made. An object of the invention is to provide a technology of appropriately allocating computer resources to an application in which a plurality of task execution entities operates.

In one embodiment, there is provided an information processing apparatus comprising memory storing instructions and at least one processor. An application runs on the information processing apparatus, the application being constituted by multiple types of tasks, the application being run by running at least one execution entity for each type of the tasks.

The at least processor is configured to execute the instructions to: acquire processing amount information indicating an amount of tasks to be processed by each execution entity; and determine a computer resource to be allocated to each execution entity, based on upper limit value information and the processing amount information, the upper limit value information indicating an upper limit value of a sum of the computer resource to be allocated to each of the execution entities.

In another embodiment, there is provided a control method performed by a computer. An application runs on the computer, the application being constituted by multiple types of tasks, the application being run by running at least one execution entity for each type of the tasks.

the method comprising: acquiring processing amount information indicating an amount of tasks to be processed by each execution entity; and determining a computer resource to be allocated to each execution entity, based on upper limit value information and the processing amount information, the upper limit value information indicating an upper limit value of a sum of the computer resource to be allocated to each of the execution entities.

In still another embodiment, there is provided a non-transitory computer-readable storage medium storing a program causing the steps in the control method to be performed by a computer.

According to the invention, a technology of appropriately allocating computer resources to an application in which a plurality of task execution entities operates is provided.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 7 is a diagram illustrating task information in a table format.

DETAILED DESCRIPTION

Figure 1:
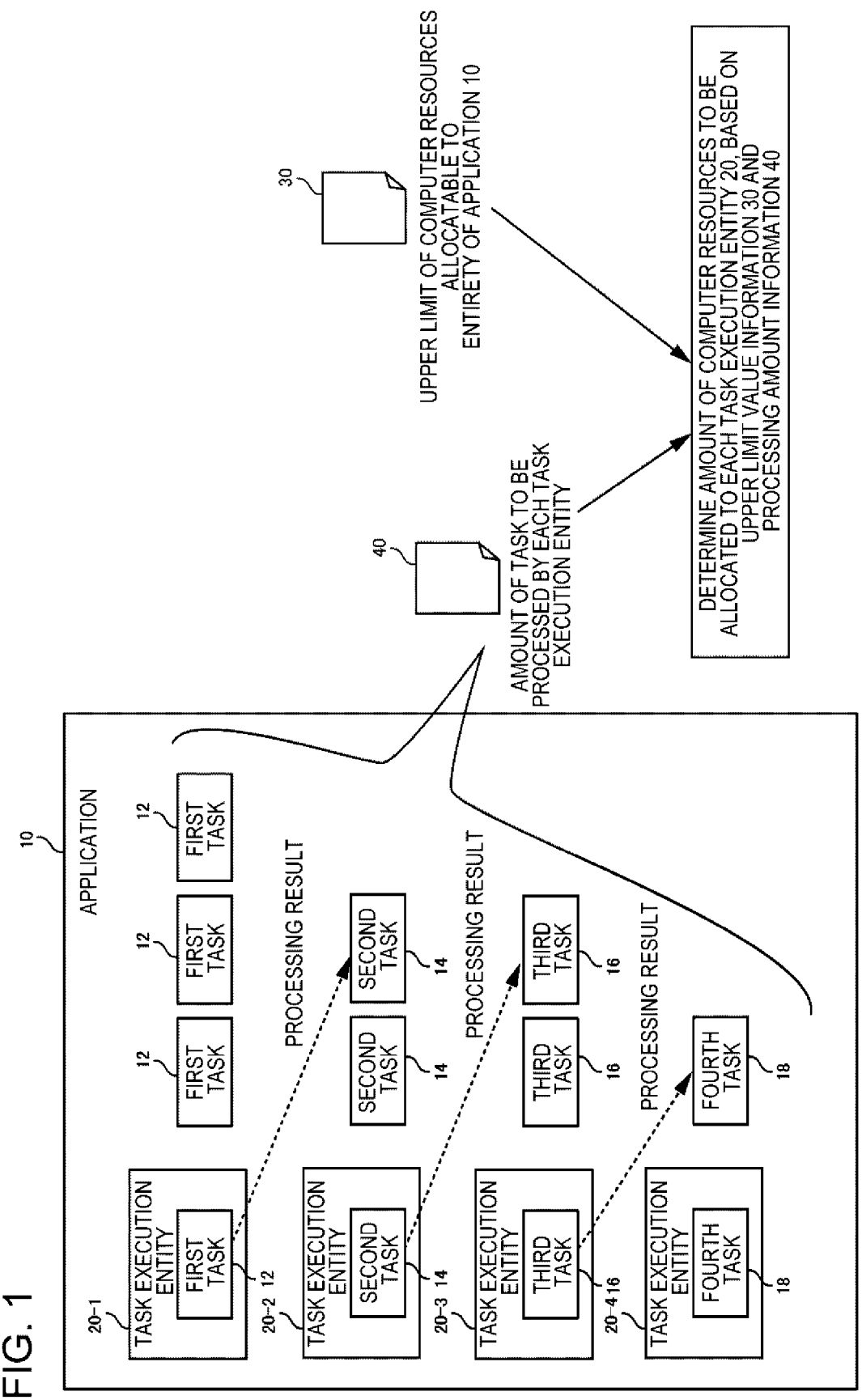
FIG. 1 is a conceptual diagram illustrating an operation of an information processing apparatus according to Example Embodiment 1.

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Hereinafter, embodiments of the invention will be described with reference to the drawings. In all drawings, the same constituent components are denoted by the same reference numerals, and descriptions thereof will not be repeated. In the block diagrams, each block represents not a component in a unit of hardware, but a component in a unit of a function, except for an exceptional case that is clearly mentioned.

In the following descriptions, unless otherwise specified, various predetermined values are stored in advance in a storage device which is accessible from a functional constituent unit that uses the predetermined value.

Example Embodiment 1

Outline

FIG. 1 is a conceptual diagram illustrating an operation of an information processing apparatus (information processing apparatus 2000 exemplified in FIG. 2) according to Example Embodiment 1. Here, an operation of the information processing apparatus 2000, which will be described with reference to FIG. 1, is just an example that makes easier understand the information processing apparatus 2000, and the operation of the information processing apparatus 2000 is not limited thereto. Details or variations of the operation of the information processing apparatus 2000 will be described later.

The information processing apparatus 2000 controls allocation of computer resources to an application 10 that operates on the information processing apparatus 2000. Processing performed by the application 10 is realized by plural types of tasks.

As the processing performed by the application 10, there may be, for example, "reading log data from a storage device, performing some processing to the log data, and then transmitting the processed log data to a server." The log data is used for analyzing a system from a viewpoint of cyber security, for example. In the log data, for example, information regarding behavior of each process operating on the information processing apparatus 2000 is recorded. For example, the information regarding the behavior of a process includes: information regarding a subject of the behavior such as a process; an object of the behavior such as a process, file, or a communication destination; information indicating the contents of the behavior (start or end of a process, reading or writing of a file, a network communication, and the like).

In this case, for example, an operation of the application 10 is realized by four types of tasks: 1) a first task 12 of sequentially reading log data from a storage; 2) a second task 14 of processing the read data; 3) a third task 16 of generating transmission data from the processed data; and 4) a fourth task 18 of transmitting the transmission data to a server. Note that, it is assumed that, in the first task 12, a portion (for example, predetermined size) of log data is read. Therefore, a plurality of first tasks 12 is generated. In addition, the second task 14, the third task 16, and the fourth task 18 are respectively generated as a result of processing of the first task 12, the second task 14, and the third task 16. Therefore, a plurality of second tasks 14, a plurality of third tasks 16, and a plurality of fourth tasks 18 are also generated.

In the information processing apparatus 2000, a task execution entity 20 that executes at least one type of task is generated. The task execution entity 20 is a process or a thread, for example. For example, as described above, in a case where four types of tasks are provided, at least four task execution entities 20 are generated.

In the example in FIG. 1, a task execution entity 20-1, a task execution entity 20-2, a task execution entity 20-3, and a task execution entity 20-4 execute the first task 12, the second task 14, the third task 16, and the fourth task 18, respectively. What is drawn inside the task execution entity 20 is a task being currently executed. What is drawn next to the task execution entity 20 is a task waiting for execution.

Here, it is assumed that an application other than the application 10 also operates in the information processing apparatus 2000. As described above, if a plurality of applications operates on a single machine, the utilization of computer resources of each application influences the amount of computer resources that other applications can use.

For example, in resident applications for malware countermeasures, processing loads concentrate in a short period of time, and thus the utilization of computer resources may increase sharply. Therefore, problems as follows occur. That is, computer resources in other applications become insufficient, and thus processing of other applications does not proceed or the operation thereof becomes unstable.

The information processing apparatus 2000 determines the amount of computer resources to be allocated to each task execution entity 20 such that the total amount of computer resources to be allocated to all task execution entities 20 (that is, the amount of computer resources to be allocated to the entirety of the application 10) does not exceed a predetermined upper limit value. Such an operation provides an effect to reduce an influence of the application 10 on an operation of other applications.

On the other hand, if the total amount of computer resources to be allocated to the application 10 has an upper limit, the application 10 may not be able to use a desired amount of computer resources. In this case, processing of the entirety of the application 10 may be delayed.

Thus, the information processing apparatus 2000 determines the amount of computer resources to be allocated to each task execution entity 20, in accordance with the amount of tasks to be processed by each task execution entity 20. Specifically, computer resources are more preferentially allocated to a task execution entity 20 having a larger amount of tasks to be processed. With such a configuration, a bottleneck is unlikely to occur in the processing of the entirety of the application 10. Thus, it provides an effect to become less likely to cause delay of the processing of the entirety of the application 10 even if there is an upper limit for the amount of available computer resources.

In order to realize the above-described functions, the information processing apparatus 2000 uses upper limit value information 30 and processing amount information 40. The upper limit value information 30 indicates the predetermined upper limit value (upper limit value of the total amount of computer resources to be allocated to all task execution entities 20). The processing amount information 40 indicates the amount of tasks to be processed by each task execution entity 20. The information processing apparatus 2000 determines the amount of computer resource to be allocated to each task execution entity 20, based on the upper limit value information 30 and the processing amount information 40.

The information processing apparatus 2000 allocates computer resources of the determined amount to each task execution entity 20. Therefore, the task execution entity 20 operates with computer resources of the determined amount. Note that, the well-known technology can be used as a technology of allocating computer resources to a task execution entity in accordance with the determined allocations. Specifically, computer resources are allocated to a task execution entity by a process scheduler or an I/O scheduler of an operating system (OS) kernel.

Here, it is not necessary that computer resources controlled by the information processing apparatus 2000 are all types of computer resources provided in the information processing apparatus 2000. For example, the information processing apparatus 2000 may perform the control of the utilization of computer resource as described above for any one type (for example, central processing unit (CPU)) of computer resources.

Advantageous Effects

According to the information processing apparatus 2000 in the example embodiment, the amount of computer resources to be allocated to each task execution entity 20 is determined based on the upper limit value information 30 and the processing amount information 40. Firstly, by controlling the total amount of computer resources to be allocated by the entirety of the application 10 so as not to exceed the upper limit value indicated by the upper limit value information 30, an influence of the operation of the application 10 on an operation of other applications is reduced. In addition, since the amount of computer resources to be allocated to each task execution entity 20 is determined in accordance with the amount of tasks to be processed by each task execution entity 20, the processing of the entirety of the application 10 is less likely to be delayed even under an environment in which there is an upper limit for the amount of available computer resources.

Figure 2:
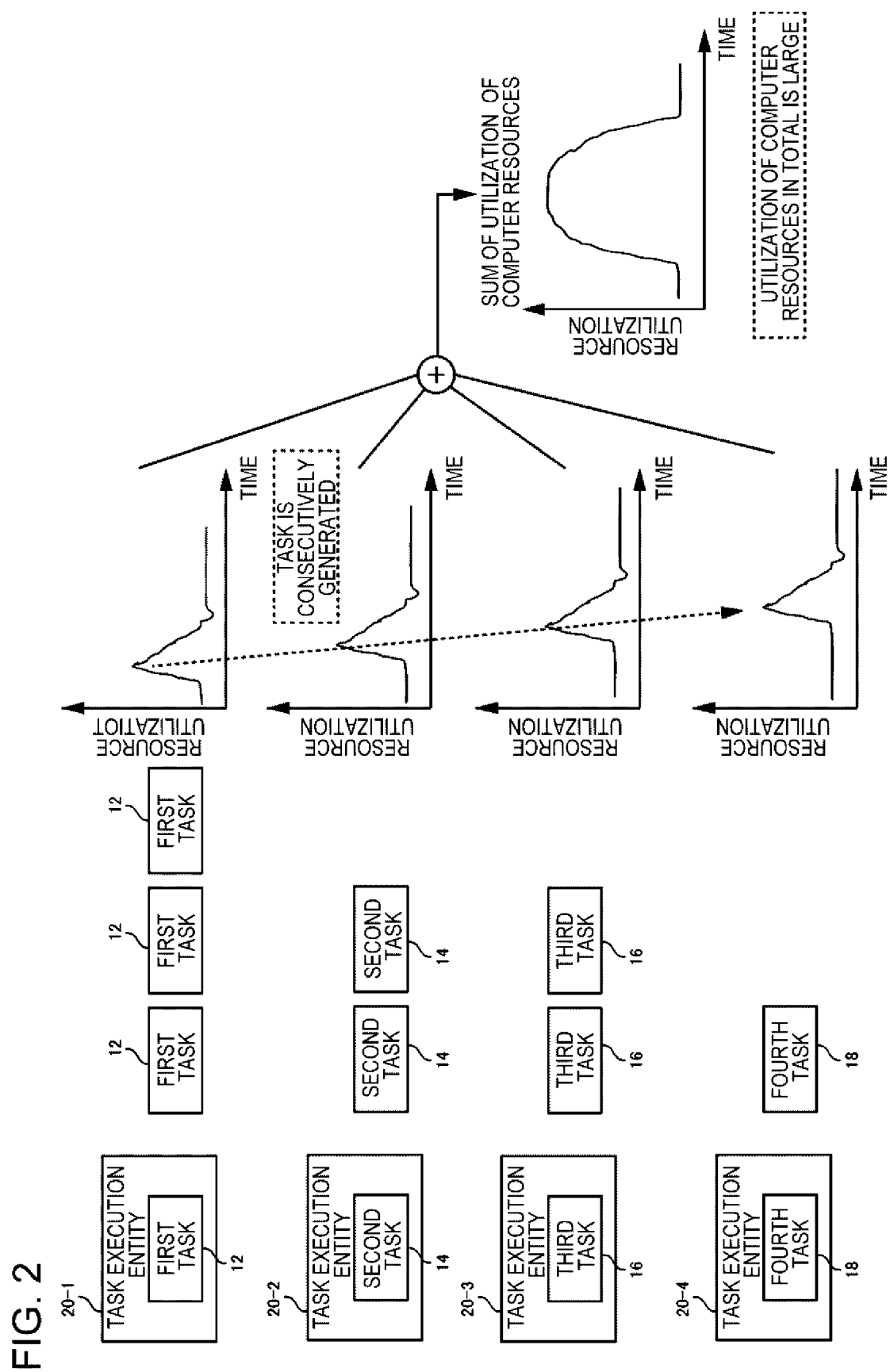
FIG. 2 is a diagram illustrating advantages of the information processing apparatus.
Figure 3:
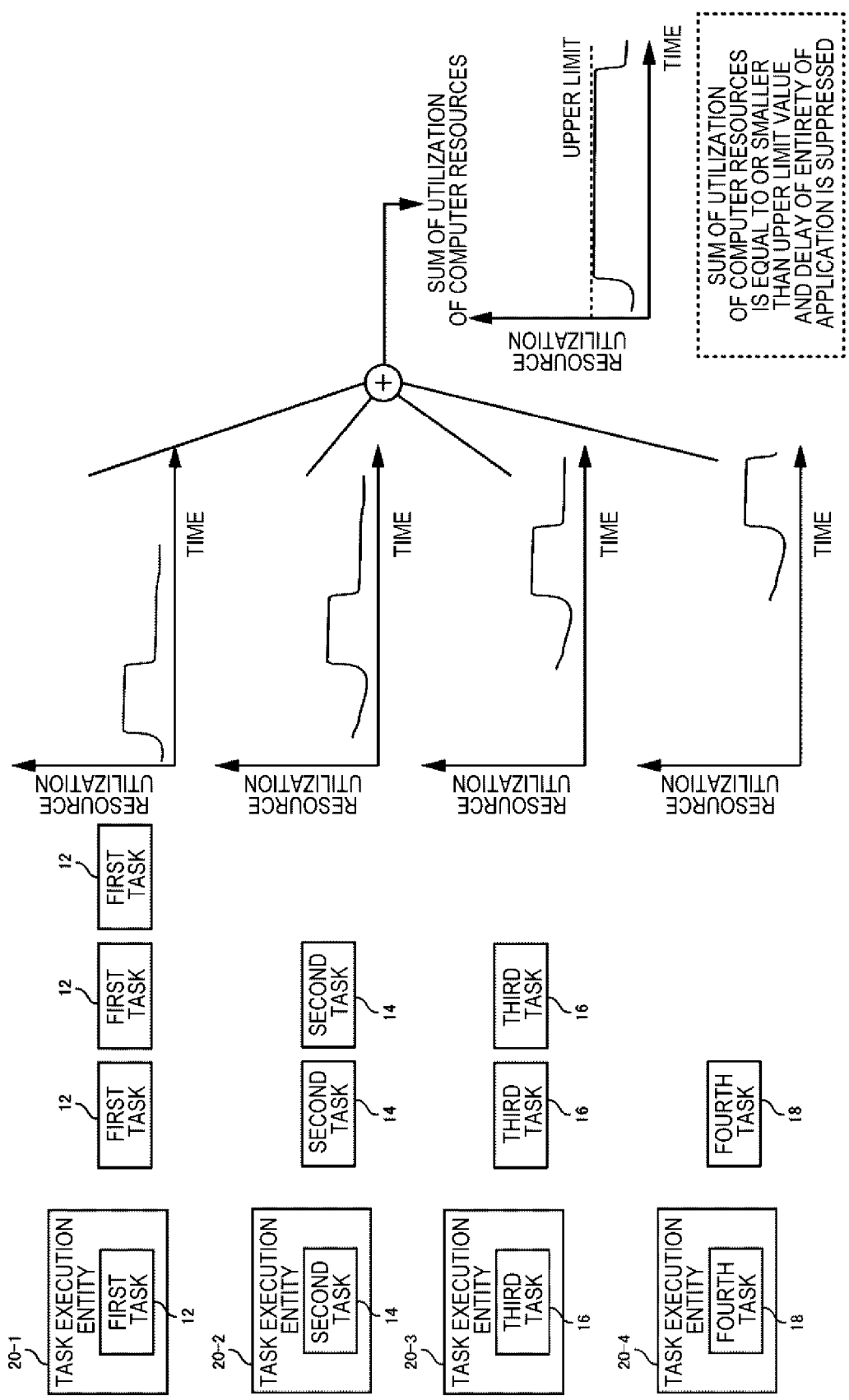
FIG. 3 is a diagram illustrating the advantages of the information processing apparatus.

Here, advantages of the information processing apparatus 2000 will be specifically described with reference to FIG. 3. FIGS. 2 and 3 are diagrams illustrating the advantages of the information processing apparatus 2000. In the example in FIG. 2, processing performed by the application 10 is identical to processing in the example in FIG. 1.

Here, when the volume of log data to be processed is large, many first tasks 12 are generated to read the large volume of log data from the storage. Further, many second tasks, many third tasks, and many fourth tasks are generated in conjunction with generation of many first tasks 12. As a result, all of the task execution entities 20 require many computer resources.

For example, into a log used for analysis from a viewpoint of cyber security, information and the like regarding behavior of a process as described above are recorded. Thus, a larger amount of information is recorded than information recorded in a general log by an OS or the like. In particular, in a case where log data are consecutively recorded in real time or a case where an application issues a large amount of file accesses (e.g. antivirus software) operates, a large amount of information is recorded in a log. Therefore, in a case where the application processes log data, each task execution entity 20 requires many computer resources.

The graph illustrated in FIG. 2 shows transitions of the utilization of computer resources of each task execution entity 20 and the utilization of computer resources of the entirety of the application 10, in a case where control of the information processing apparatus 2000 is not performed. Since the amount of computer resources which the application 10 can use does not have an upper limit, the utilization of computer resources of each task execution entity 20 is large, and thus the utilization of computer resources of the entirety of the application 10 is also large. In such a situation, the amount of computer resources required for an operation of another application may become insufficient. Thus, the operation of this application becomes slow. In the worst case, this application freezes. Thus, in this case, the operation of the application 10 influences the operation of another application. For example, in an operation technology (OT) products or server machines, regarding an application to be operated in the background (for example, application of processing the above-described log), it is required not to influence an application operating in the foreground, in many cases. Thus, it is not preferable that the operation of the application 10 affects the operation of another application.

The graph illustrated in FIG. 3 shows transitions of the utilization of computer resources of each task execution entity 20 and the utilization of computer resources of the entirety of the application 10, in a case where the control of the information processing apparatus 2000 is performed. Firstly, the amount of computer resources to be used in the entirety of the application 10 is suppressed to be equal to or smaller than the upper limit value. Therefore, an operation of another application is less likely to be disturbed. Further, since computer resources are preferentially allocated to a task execution entity 20 having a large amount of tasks to be processed, a bottleneck does not occur in the processing of the entirety of the application 10, and the delay of the processing in the entirety of the application 10 is suppressed.

The information processing apparatus 2000 will be more specifically described below.

Example of Functional Configuration

Figure 4:
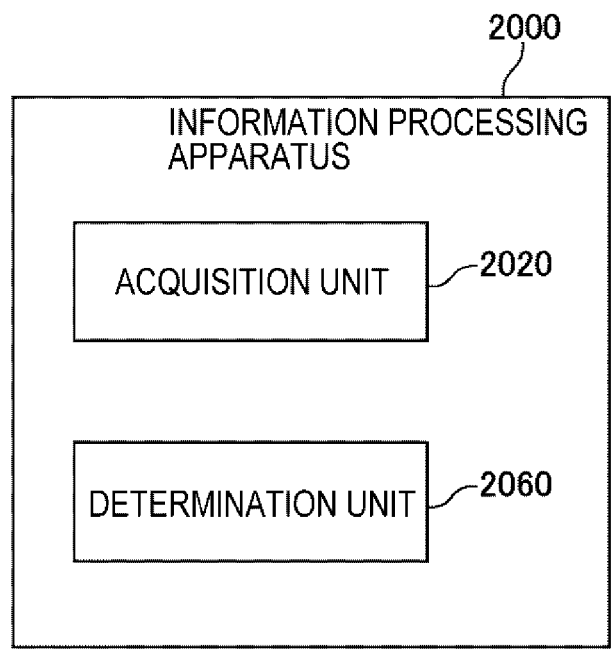
FIG. 4 is a diagram illustrating a functional configuration of the information processing apparatus.

FIG. 4 is a diagram illustrating a functional configuration of the information processing apparatus 2000. The information processing apparatus 2000 includes an acquisition unit 2020 and a determination unit 2060. The acquisition unit 2020 acquires the processing amount information 40. The determination unit 2060 determines computer resources to be allocated to each task execution entity 20, based on the upper limit value information 30 and the processing amount information 40.

Example of Hardware Configuration of Information Processing Apparatus 2000

Each functional constituent unit of the information processing apparatus 2000 may be realized by hardware (for example, hard-wired electronic circuit) for realizing each functional constituent unit, or may be realized by a combination of hardware and software (for example, combination of an electronic circuit and a program of controlling the electronic circuit). A case where the functional constituent units of the information processing apparatus 2000 are realized by a combination of hardware and software will be described below.

A computer 1000 may be one of various types of computers. For example, the computer 1000 may be a PC, a server machine, a tablet terminal, a smartphone, or the like. The computer 1000 may be a special-purpose computer designed for realizing the information processing apparatus 2000, or may be a general-purpose computer.

Figure 5:
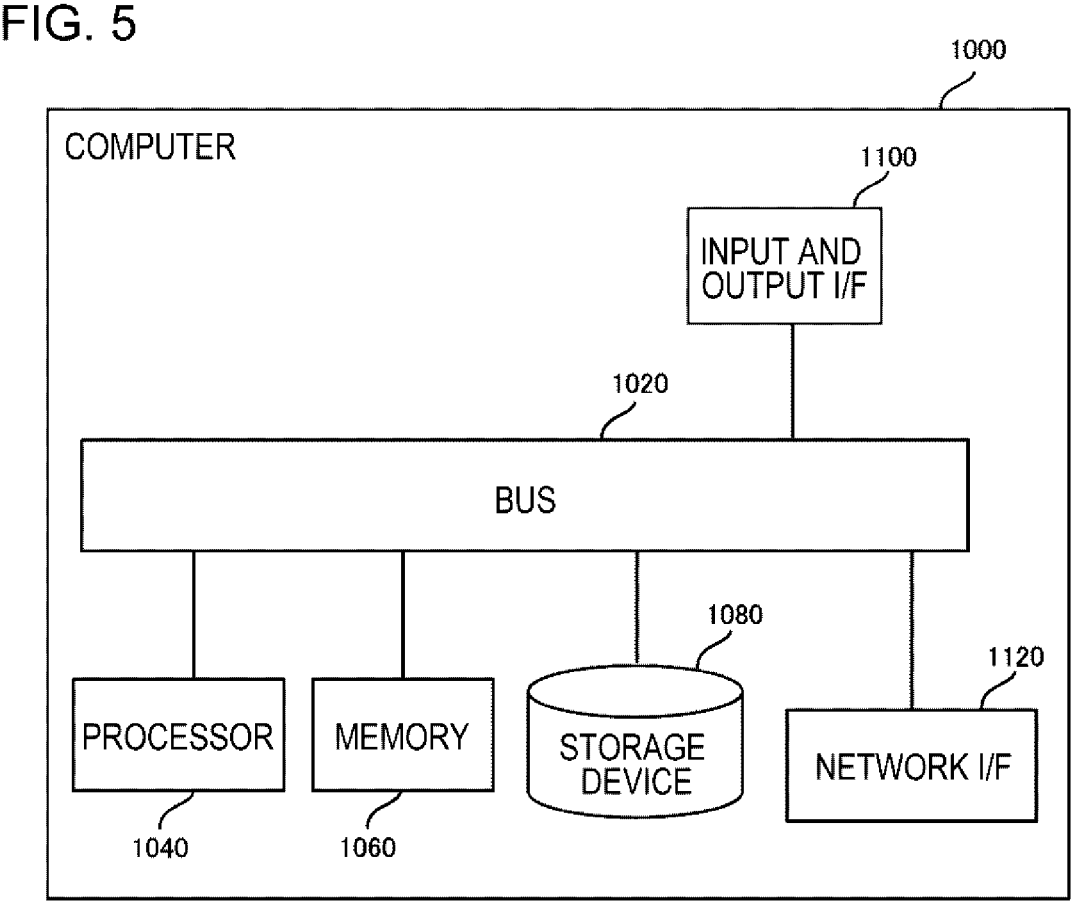
FIG. 5 is a diagram illustrating a configuration of a computer realizing the information processing apparatus.

FIG. 5 is a diagram illustrating a configuration of the computer 1000 for realizing the information processing apparatus 2000. The computer 1000 includes a bus 1020, a processor 1040, a memory 1060, a storage device 1080, an input and output interface 1100, and a network interface 1120. The bus 1020 is a data transmission path for causing the processor 1040, the memory 1060, the storage device 1080, the input and output interface 1100, and the network interface 1120 to transmit and receive data to and from each other. A method of connecting the processor 1040 and the like to each other is not limited to bus connection. The processor 1040 is a processor realized by a CPU, a graphics processing unit (GPU), or the like. The memory 1060 is a primary storage device realized by a random access memory (RAM) or the like. The storage device 1080 is a secondary storage device realized by a hard disk drive, a solid state drive (SSD), a memory card, a read only memory (ROM), or the like. The input and output interface 1100 is an interface for connecting the computer 1000 and an input and output device to each other. For example, an input device such as a keyboard or an output device such as a display device is connected to the input and output interface 1100. The network interface 1120 is an interface for connecting the computer 1000 to a network. As the communication network, for example, a local area network (LAN) or a wide area network (WAN) is provided. A method of connecting the network interface 1120 to the network may be a wireless connection or may be a wired connection.

The storage device 1080 stores a program module for realizing a function of the information processing apparatus 2000. The processor 1040 executes program modules so as to realize functions corresponding to the program modules.

Flow of Processing

Figure 6:
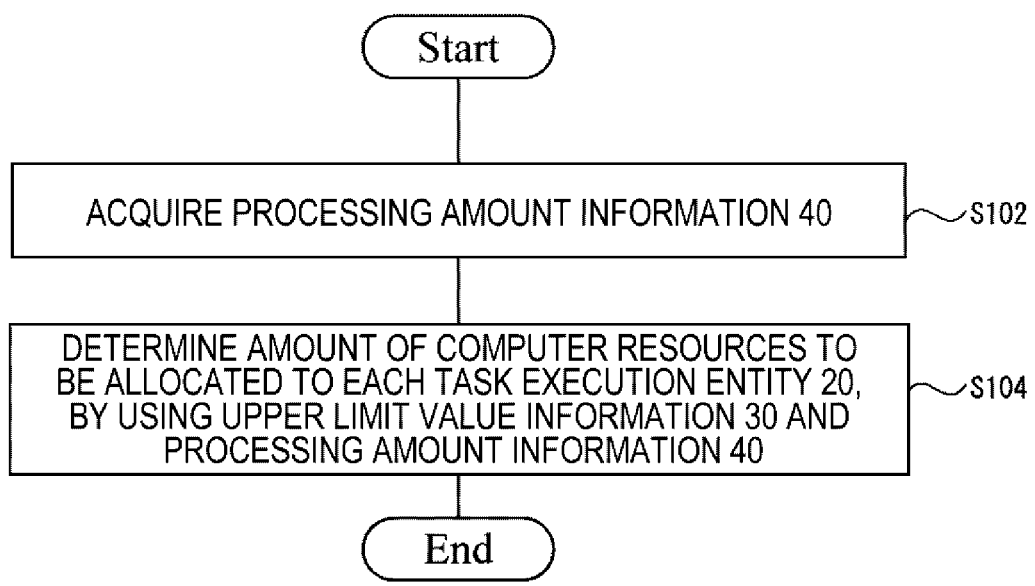
FIG. 6 is a flowchart illustrating a flow of processing performed by the information processing apparatus in Example Embodiment 1.

FIG. 6 is a flowchart illustrating a flow of processing performed by the information processing apparatus 2000 in Example Embodiment 1. The acquisition unit 2020 acquires the processing amount information 40 (S102). The determination unit 2060 determines the amount of computer resources to be allocated to each task execution entity 20, based on the upper limit value information 30 and the processing amount information 40 (S104).

There are various opportunities for causing the information processing apparatus 2000 to perform the series of processes illustrated in FIG. 6. For example, the information processing apparatus 2000 (regularly) repeats the series of processes at a predetermined time interval.

Regarding Upper Limit Value Information 30

The upper limit value information 30 indicates the upper limit value of the amount of computer resources to be allocated to the application 10. A computer resource as a control target may be, for example, CPU resource, the bandwidth for storage access, the bandwidth for network access bandwidth, and the like. Note that, the upper limit value indicated by the upper limit value information 30 may be represented by an absolute value (for example, 1.0 GHz of the CPU resource) or may be represented by a relative value to the maximum amount (for example, 60% of the CPU utilization).

The upper limit value information 30 may be set in the determination unit 2060 in advance, or may be acquired by the acquisition unit 2020. There are various methods for the acquisition unit 2020 to acquire the upper limit value information 30. For example, the acquisition unit 2020 acquires the upper limit value information 30 stored in a storage device accessible from the acquisition unit 2020. In addition, for example, the acquisition unit 2020 may acquire the upper limit value information 30 by receiving the upper limit value information transmitted from another device.

Arbitrary method can be used to generate the upper limit value information 30. For example, the upper limit value information 30 is manually created by a manager or the like of the information processing apparatus 2000. In addition, for example, the upper limit value information 30 may be automatically generated by the information processing apparatus 2000. For example, the information processing apparatus 2000 equally divide computer resources of the information processing apparatus 2000 for each application. More specifically, the information processing apparatus 2000 divides the total amount of computer resources of the information processing apparatus 2000 by the number of applications running on the information processing apparatus 2000, and set the value obtained by the above calculation to the upper limit value information 30. In another example, a priority may be assigned to each application, and then computer resources may be distributed to the application running on the information processing apparatus 2000 in accordance with the ratio of the priorities. In this case, the information processing apparatus 2000 computes the upper limit value to be set in the upper limit value information 30, based on the priority of the application 10.

Acquisition of Processing Amount Information 40: S102

The acquisition unit 2020 acquires the processing amount information 40 (S102). The processing amount information 40 is information indicating the amount of tasks to be processed by the task execution entity 20.

For example, a task to be processed by the task execution entity 20 is managed in a queue. That is, a queue is provided for each task execution entity 20. A queue corresponding to a certain task execution entity 20 stores data (hereinafter, task definition data) for defining a task to be processed by the task execution entity 20, for each task. For example, in a case where five tasks are to be processed by the task execution entity 20, five pieces of task definition data are stored in a queue. Note that, the well-known technology can be used as a technology of managing a task to be processed by a process or a thread, in a queue.

As described above, if a queue is provided for each task execution entity 20, the length of the queue corresponding to the task execution entity 20 represents the amount of tasks to be processed by the task execution entity 20. Thus, for example, the processing amount information 40 of each task execution entity 20 indicates the length of the queue corresponding to the task execution entity 20. The determination unit 2060 recognizes the amount of tasks to be processed by each task execution entity 20, based on the length of a queue, which is indicated by the processing amount information 40 acquired for each task execution entity 20.

For example, the processing amount information 40 is generated by each task execution entity 20. When the length of the corresponding queue is changed (when task definition data is extracted from the queue or when new task definition data is stored in the queue), the task execution entity 20 generates processing amount information 40 indicating the changed length of the queue and stores the processing amount information in the storage device. Note that, in a case where processing amount information 40 for a certain task execution entity 20 is already stored in the storage device, the task execution entity 20 overwrites the processing amount information 40 which has been already stored by the processing amount information 40 which has been newly generated. In another example, the task execution entity 20 may output the generated processing amount information 40 to the acquisition unit 2020.

There are various methods for the acquisition unit 2020 to acquire the processing amount information 40. For example, the acquisition unit 2020 acquires the processing amount information 40 from the storage device in which the processing amount information 40 has been stored. In another example, the acquisition unit 2020 acquires the processing amount information 40 which has been output to the acquisition unit 2020 from the task execution entity 20.

Allocation of Computer Resource: S104

The determination unit 2060 determines the amount of computer resources to be allocated to each task execution entity 20, based on the upper limit value information 30 and the processing amount information 40 (S104). For example, the determination unit 2060 allocates the same amount of computer resources as the upper limit value indicated by the upper limit value information 30, to a task execution entity 20 having the largest amount of tasks to be processed (for example, task execution entity 20 in which the length of the corresponding queue is the longest). In this case, only a task execution entity 20 having the largest amount of tasks to be processed operates, and operations of other task execution entities 20 are suspended.

In another example, the determination unit 2060 distributes the same amount of computer resources as the upper limit value indicated by the upper limit value information 30, to task execution entities 20 at a ratio based on the amount of tasks to be processed. For example, the amount of computer resources to be allocated to the task execution entity 20 is determined by Expression (1).

Expression (1)

$$r[i] = r_{max} * \frac{p[i]}{P_{total}} \quad (1)$$

r[i] represents the amount of computer resource to be allocated to a task execution entity 20 (hereinafter, task execution entity 20i) with the identifier i. $r_{max}$ represents the upper limit value indicated by the upper limit value information 30. p[i] represents the priority of the task execution entity 20i, which has been determined based on the amount of tasks to be processed by the task execution entity 20i. $P_{total}$ represents the total sum of priorities of all task execution entities 20.

The larger the amount of tasks to be processed by the task execution entity 20i is, the larger the value set to p[i] becomes. For example, the determination unit 2060 sets the length of a queue corresponding to the task execution entity 20i to p[i]. In another example, the determination unit 2060 may set to p[i] a value that is obtained by inputting the length of the queue corresponding to the task execution entity 20i into a predetermined monotonically non-decreasing function.

The determination unit 2060 determines allocation of computer resources to be controlled, for each task execution entity 20, by the above-described method. Here, in a case where there are a plurality of computer resource to be controlled, the determination unit 2060 determines allocation of computer resources to each task execution entity 20, for each computer resource.

Example Embodiment 2

Similar to the functional configuration of the information processing apparatus 2000 in Example Embodiment 1, for example, FIG. 4 illustrates the functional configuration of an information processing apparatus 2000 in Example Embodiment 2. The information processing apparatus 2000 in Example Embodiment 2 has a function similar to that of the information processing apparatus 2000 in Example Embodiment 1.

The information processing apparatus 2000 in Example Embodiment 2 determines the amount of computer resources to be allocated to each task execution entity 20 so that an execution of a task by a task execution entity 20 having the largest amount of tasks to be processed is less likely to be deteriorated. With such a configuration, a bottleneck is unlikely to occur in processing of a task execution entity 20 having a large amount of tasks to be processed.

Firstly, the determination unit 2060 determines a task execution entity 20 having the largest amount of tasks to be processed. For example, as will be described above, in a case where the amount of tasks to be processed is represented by the length of the queue, the information processing apparatus 2000 determines a task execution entity 20 in which the length of the corresponding queue is the longest.

Then, the determination unit 2060 determines a computer resource having the largest load applied by the determined task execution entity 20. For example, when the task execution entity 20 executes a CPU-intensive task, the load applied to the CPU is the largest. Similarly, when the task execution entity 20 executes a network-intensive task, a load applied to a bandwidth of the network is the largest.

The determination unit 2060 determines a task execution entity 20 that applies the largest load to the determined computer resource. For example, in a case where the determined computer resource is a CPU, the task execution entity 20 to be determined here is a task execution entity 20 that executes a CPU-intensive task. The determination unit 2060 makes low a priority for allocation of the amount of computer resources to the determined task execution entity 20.

For example, the determination unit 2060 does not allocate computer resources to a task execution entity 20 that applies the largest load to the determined computer resource (sets its priority to zero).

In another example, the determination unit 2060 determines a priority of a task execution entity 20 that applies the largest load to the determined computer resource, as a value lower than the priority based on the amount of tasks to be processed by the task execution entity 20, e.g. a value obtained by multiplying the length of the queue by a coefficient α which is smaller than 1. The determination unit 2060 determines the priority of the other task execution entities 20 based on the amount of tasks to be processed by the task execution entity 20, e.g. length of the queue. With such a configuration, the priority of the task execution entity 20 that applies the largest load to the determined computer resource is set to be lower than a priority that is determined only based on the amount of tasks to be processed.

Here, it is necessary that the determination unit 2060 recognizes "to which computer resource the task execution entity 20 applies the largest load." For example, information that associates a task with a computer resource to which the task applies the largest load is stored in the storage device in advance. Such information is referred to as task information below.

Figure 7:
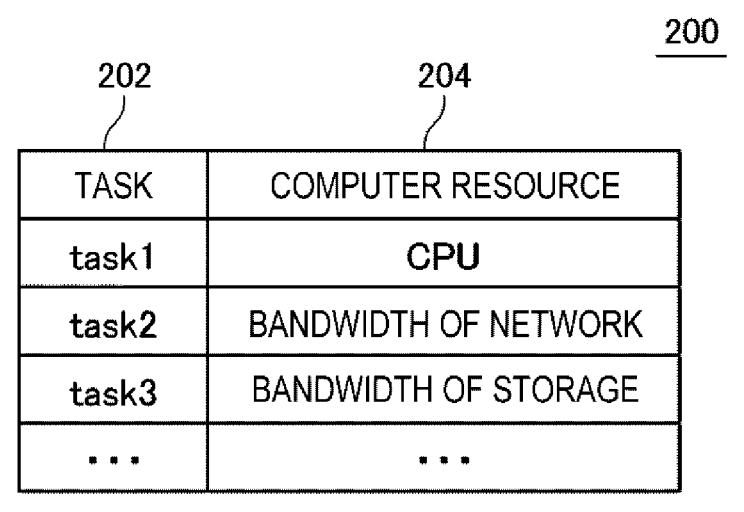

FIG. 7 is a diagram illustrating the task information in a table format. A table illustrated in FIG. 7 is referred to as a table 200. The table 200 has two columns of a task 202 and a computer resource 204. The computer resource 204 associated with the task 202 indicates a computer resource to which the task shown in the task 202 applies the largest load. The determination unit 2060 acquires task information for a task executed by each task execution entity 20 so as to determine a computer resource to which the largest load is applied by each task execution entity 20.

In addition, for example, the determination unit 2060 may determine a computer resource to which the largest load is applied by the task execution entity 20, based on history of the utilization of the computer resource of the task execution entity 20.

Example of Hardware Configuration

A hardware configuration of a computer for realizing the information processing apparatus 2000 in Example Embodiment 2 is illustrated in, for example, FIG. 5, similar to Example Embodiment 1. A program module for realizing the function of the information processing apparatus 2000 in this example embodiment is stored in the storage device 1080 of the computer 1000 for realizing the information processing apparatus 2000 in this example embodiment.

Hitherto, the example embodiments of the invention are described with reference to the drawings. However, the example embodiments are just examples of the invention, and various configurations other than the above-described configurations can be employed.

It is apparent that the present invention is not limited to the above embodiment, and may be modified and changed without departing from the scope and spirit of the invention.

This application claims the benefit of priority from Japanese Patent Application No. 2018-069581 filed on Mar. 30, 2018, the entire disclosure of which is incorporated herein.

What is claimed is:

1. An information processing apparatus which executes an application, the application being constituted by multiple types of tasks, the application being run by running at least one execution entity for each type of the tasks, the information processing apparatus comprising:
  memory storing instructions; and
  at least one processor configured to execute the instructions to:
    acquire processing amount information indicating an amount of tasks to be processed by each execution entity;
    determine a computer resource to be allocated to each execution entity, based on upper limit value information and the processing amount information, the upper limit value information indicating an upper limit value of a sum of the computer resource to be allocated to each of the execution entities;
    determine the execution entity in which an amount of the tasks to be processed is the largest;
    determine a computer resource to which the largest load is applied by the execution entity;
    determine a lower priority of allocating a computer resource for an execution entity which applies the largest load to the determined computer resource, than a priority for other execution entity;
    assign a priority determined based on an amount of the tasks to be processed, to the determined execution entity and the execution entity that applies largest load to a computer resource other than the determined computer resource;
    assign a priority lower than the priority determined based on the amount of the tasks to be processed, to the execution entity that applies the largest load to the determined computer resource;
    determine an amount of a computer resource to be allocated to the execution entity based on the priority assigned to the execution entity; and
    allocate a larger amount of computer resource to the execution entity having a queue with a longer length,
  wherein a queue storing the amount of the tasks to be processed by the execution entity is provided for each execution entity, and the processing amount information indicates a length of the queue of each execution entity.

2. The information processing apparatus according to claim 1, the at least one processor is further configured to more preferentially allocates an amount of computer resource that is equal to or smaller than the upper limit value, to the execution entity having a larger amount of the tasks to be processed.

3. The information processing apparatus according to claim 1, wherein the at least one processor is further configured to:
  acquire task information that associates the task and the computer resource to which the associated task applies the largest load; and
  determine the computer resource to which the execution entity applies the largest load, as the computer resource that is associated with the task executed by the execution entity in the task information.

4. The information processing apparatus according to claim 1, wherein the task executed by the execution entity is generated by the task executed by another execution entity.

5. A control method performed by a computer which executes an application, the application being constituted by multiple types of tasks, the application being run by running at least one execution entity for each type of the tasks, the method comprising:
  acquiring processing amount information indicating an amount of tasks to be processed by each execution entity;
  determining a computer resource to be allocated to each execution entity, based on upper limit value information and the processing amount information, the upper limit value information indicating an upper limit value of a sum of the computer resource to be allocated to each of the execution entities;
  determining the execution entity in which an amount of the tasks to be processed is the largest;
  determining a computer resource to which the largest load is applied by the execution entity;
  determining a lower priority of allocating a computer resource for an execution entity which applies the largest load to the determined computer resource, than a priority for other execution entity;
  assigning a priority determined based on an amount of the tasks to be processed, to the determined execution entity and the execution entity that applies largest load to a computer resource other than the determined computer resource;
  assigning a priority lower than the priority determined based on the amount of the tasks to be processed, to the execution entity that applies the largest load to the determined computer resource;
  determining an amount of a computer resource to be allocated to the execution entity based on the priority assigned to the execution entity; and
  allocating a larger amount of computer resource to the execution entity having a queue with a longer length,
  wherein a queue storing the amount of the tasks to be processed by the execution entity is provided for each execution entity, and the processing amount information indicates a length of the queue of each execution entity.

6. A non-transitory computer-readable storage medium storing a program executed in a computer which executes an application, the application being constituted by multiple types of tasks, the application being run by running at least one execution entity for each type of the tasks,
  the program causing the computer to perform:
    acquiring processing amount information indicating an amount of tasks to be processed by each execution entity;
    determining a computer resource to be allocated to each execution entity, based on upper limit value information and the processing amount information, the upper limit value information indicating an upper limit value of a sum of the computer resource to be allocated to each of the execution entities;
    determining the execution entity in which an amount of the tasks to be processed is the largest;
    determining a computer resource to which the largest load is applied by the execution entity;
    determining a lower priority of allocating a computer resource for an execution entity which applies the largest load to the determined computer resource, than a priority for other execution entity;

assigning a priority determined based on an amount of the tasks to be processed, to the determined execution entity and the execution entity that applies largest load to a computer resource other than the determined computer resource;

assigning a priority lower than the priority determined based on the amount of the tasks to be processed, to the execution entity that applies the largest load to the determined computer resource;

determining an amount of a computer resource to be allocated to the execution entity based on the priority assigned to the execution entity; and allocating a larger amount of computer resource to the execution entity having a queue with a longer length, wherein a queue storing the amount of the tasks to be processed by the execution entity is provided for each execution entity, and the processing amount information indicates a length of the queue of each execution entity.

* * * * *